United States Patent
Tang (10) Patent No.: US 11,178,634 B2
(45) Date of Patent: Nov. 16, 2021

(54) PAGING METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 272 days.

(21) Appl. No.: 16/335,574

(22) PCT Filed: Jan. 31, 2018

(86) PCT No.: PCT/CN2018/074839
§ 371 (c)(1),
(2) Date: Mar. 21, 2019

(87) PCT Pub. No.: WO2019/148401
PCT Pub. Date: Aug. 8, 2019

(65) Prior Publication Data
US 2021/0127350 A1    Apr. 29, 2021

(51) Int. Cl.
*H04W 68/00* (2009.01)
*H04W 76/11* (2018.01)
*H04W 76/27* (2018.01)
*H04W 24/08* (2009.01)

(52) U.S. Cl.
CPC ......... *H04W 68/005* (2013.01); *H04W 24/08* (2013.01); *H04W 76/11* (2018.02); *H04W 76/27* (2018.02)

(58) Field of Classification Search
CPC ..... H04W 24/08; H04W 76/27; H04W 76/11; H04W 68/005; H04W 68/02; H04W 72/04; H04W 68/025; H04W 4/08; H04W 4/12; H04W 4/90; H04W 476/40
See application file for complete search history.

(56) References Cited

U.S. PATENT DOCUMENTS

| | | | |
|---|---|---|---|
| 2012/0076085 A1 | 3/2012 | Chou | |
| 2012/0276933 A1* | 11/2012 | Laitinen | H04W 68/025 455/458 |
| 2013/0155954 A1 | 6/2013 | Wang et al. | |

(Continued)

FOREIGN PATENT DOCUMENTS

| CN | 1835640 B | 9/2010 |
|---|---|---|
| CN | 102625254 B | 12/2015 |

(Continued)

OTHER PUBLICATIONS

Extended European Search Report dated Aug. 8, 2019; Appln. No. 18855166.7.

(Continued)

*Primary Examiner* — Dai Phuong (57) ABSTRACT

Embodiments of the application provide a paging method, a network device and terminal device. The method includes that: a network device determines a PO for a terminal device according to an identifier of the terminal device and an AC corresponding to the terminal device; and the network device sends a paging message intended for the terminal device at the PO for the terminal device.

17 Claims, 3 Drawing Sheets

200 — Determine, by a network device, a PO for a terminal device according to an identifier of the terminal device and an AC corresponding to the terminal device — S 210

Send, by the network device, a paging message intended for the terminal device at the PO for the terminal device — S 220

(56) References Cited

U.S. PATENT DOCUMENTS

| | | | | |
|---|---|---|---|---|
| 2014/0080496 | A1* | 3/2014 | Terry | H04W 72/04 455/450 |
| 2014/0126458 | A1* | 5/2014 | Cho | H04L 12/189 370/312 |
| 2014/0348116 | A1* | 11/2014 | Yamada | H04L 47/24 370/329 |
| 2016/0014717 | A1 | 1/2016 | Wang et al. | |
| 2016/0360504 | A1* | 12/2016 | Wang | H04W 68/025 |
| 2017/0142560 | A1* | 5/2017 | Ryu | H04W 68/025 |
| 2017/0273078 | A1 | 9/2017 | Rico Alvarino et al. | |

FOREIGN PATENT DOCUMENTS

| | | |
|---|---|---|
| CN | 103200680 B | 12/2015 |
| CN | 105992342 A | 10/2016 |
| CN | 106550454 A | 3/2017 |
| CN | 106961688 A | 7/2017 |
| CN | 107211239 A | 9/2017 |
| CN | 107534951 A | 1/2018 |
| EP | 2373110 A2 | 10/2011 |
| WO | 2013007193 A1 | 1/2013 |
| WO | 2015181254 A1 | 12/2015 |
| WO | 2018004541 A1 | 1/2018 |

OTHER PUBLICATIONS

3 Generation Partnership Project; Technical Specification Group Radio Access Network; Evolved Universal Terrestrial Radio Access(E-UTRA); User Equipment (UE) procedures in idle mode (Release 14), 3GPP Standard; Technical Specification; 3GPP TS 36.304, 3rd Generation Partnership Project (3GPP), vol. RAN WG2, No. V14.5.0, Jan. 7, 2018, pp. 1-49, XP051392407.

MediaTek Inc., Paging and SS Block Transmission in NR, 3GPP TSG-RAN WG2 Meeting AH-1801, R2-1801304, Jan. 12, 2018.

CMCC, Discussion on Paging Occasion Design for NR, 3GPP TSG-RAN WG2 NR Ad hoc 1801, R2-1800809, Jan. 12, 2018.

3GPP TSG-RAN WG2 Meeting AH 1801 Vancouver, Canada, Jan. 22-Jan. 26, 2018, Agenda Item: 10.4.1.8.1, Source: Huawei, HiSilicon, Title: Access Control for MT, R2-1801095.

3GPP TS 36.304 V14.4.0 (Sep. 2017), 3rd Generation Partnership Project; Technical Specification Group Radio Access Network; Evolved Universal Terrestrial Radio Access (E-UTRA); User Equipment(UE) procedures in idle mode (Release 14).

3GPP TS 36.331 V12.16.0 (Dec. 2017), 3rd Generation Partnership Project; Technical Specification Group Radio Access Network; Evolved Universal Terrestrial Radio Access (E-UTRA); Radio Resource Control (RRC); Protocol specification(Release 12).

Huawei, Hisilicon; "Definition of Paging Frame and Paging Occasion", 3GPP TSG-RAN WG2 Ad Hoc, Vancouver, Canada, Jan. 22-26, 2018; R2-1801097, 6 pages.

Oppo; "Paging Occasion and Time Slot Determination in NR", 3GPP TSG-RAN2 Meeting 99, Berlin, Germany, Aug. 21-25, 2017; R2-1707761; 3 pages.

The first Office Action for the corresponding CN patent application No. 201880003462.5, dated Dec. 3, 2019 with English translation from Global Dossier.

Huawei, Hisilicon; "Definitiion of Paging Frame and Paging Occasion", 3GPP TSG-RAN WG2 Ad Hoc, Vancouver, Canada, Jan. 22-26, 2018; R2-1801097, 6 pages.

The Second Chinese Office Action dated Mar. 18, 2020; Appln. No. 201880003462.5.

* cited by examiner

PAGING METHOD, NETWORK DEVICE AND TERMINAL DEVICE

TECHNICAL FIELD

The application relates to the field of communications, and more particularly to a paging method, a network device and a terminal device.

BACKGROUND

A Long Term Evolution (LTE) system can support paging. A Paging Frame (PF) and a Paging Occasion (PO) may be calculated based on an identifier of a terminal device (for example, a User Equipment Identifier (UE ID) which may be embodied as a part of a truncated International Mobile Subscriber Identification Number (IMSI)) and a system broadcast parameter. Within the PO, a terminal device detects a control channel, e.g., a Physical Downlink Control Channel (PDCCH), adopts a Paging Radio Network Temporary Identifier (P-RNTI) to perform decoding and then receives a paging message in a Physical Downlink Shared Channel (PDSCH) according to a decoding result. The paging message includes UE identifier information of an upper layer, for example, an SAE-Temporary Mobile Subscriber Identifier (S-TSMI), which may enable the terminal device to judge whether a response to the paging message from a network is required to be given or not. In 5-Generation New Radio (5G NR), the same paging message is sent through different beams to ensure that the paging message can reach the terminal device. However, paging in the abovementioned paging manner supporting LTE may bring a high paging overhead. In addition, the PO based on which the PDCCH is detected is calculated by the terminal device according to the UE ID only, and the terminal device may frequently read Downlink Control Information (DCI) and even paging messages not belonging to this terminal device.

SUMMARY

Embodiments of the application provide a paging method, a network device and a terminal device. The network device determines a PO according to a UE ID and an Access Class (AC), thereby reducing an overhead brought by a paging process.

According to a first embodiment, the embodiments of the application provide a paging method, which may include that:

a network device determines a PO for a terminal device according to an identifier of the terminal device and an AC corresponding to the terminal device; and the network device sends a paging message intended for the terminal device at the PO for the terminal device.

In the paging method of the embodiments of the application, the network device determines the PO for the terminal device according to the identifier of the terminal device and the AC corresponding to the terminal device, and sends the paging message intended for the terminal device at the PO for the terminal device, so that the terminal device can be prevented from reading DCI and paging messages not belonging to this terminal device, and an overhead brought by a paging process may further be reduced.

In an exemplary implementation of the first embodiment, the operation that the network device determines the PO for the terminal device according to the identifier of the terminal device and the AC corresponding to the terminal device may include that:

the network device determines at least one paging group to which the terminal device belongs according to the identifier of the terminal device and the AC corresponding to the terminal device, wherein multiple terminal devices belonging to a same paging group have a same PO and multiple terminal devices in different paging groups have different POs, and the network device determines a PO of a paging group to which the terminal device presently belongs; and the operation that the network device sends the paging message intended for the terminal device at the PO for the terminal device may include that:

the network device sends the paging message intended for the terminal device at the PO of the paging group to which the terminal device presently belongs.

In an exemplary implementation of the first embodiment, the method may further include that:

the network device sends first indication information to the terminal device through a PDCCH, the first indication information being configured to indicate the paging group to which the terminal device presently belongs.

In an exemplary implementation of the first embodiment, before the operation that the network device sends the paging message intended for the terminal device at the PO for the terminal device, the method may further include that:

the network device sends a system broadcast message to the terminal device, the system broadcast message including second indication information and the second indication information being configured to indicate a corresponding relationship between at least one paging group and at least one AC.

In an exemplary implementation of the first embodiment, before the operation that the network device sends the paging message intended for the terminal device at the PO for the terminal device, the method may further include that:

the network device sends third indication information to the terminal device through Radio Resource Control (RRC) signaling, the third indication information being configured to indicate a corresponding relationship between at least one paging group and at least one AC.

In an exemplary implementation of the first embodiment, in a case where the corresponding relationship, indicated by the third indication information, between the at least one paging group and the at least one AC is the same in multiple cells, the third indication information may further be configured to indicate cell information of the multiple cells.

In an exemplary implementation of the first embodiment, in a case where the terminal device corresponds to multiple ACs, the operation that the network device determines the PO for the terminal device according to the identifier of the terminal device and the AC corresponding to the terminal device may include that:

the network device determines the PO for the terminal device according to the identifier of the terminal device and a first AC, the first AC belonging to the multiple ACs.

According to a second embodiment, the embodiments of the application provide a paging method, which may include that:

A terminal device determines a PO for the terminal device according to an identifier of the terminal device and an AC corresponding to the terminal device; and the terminal device monitors a paging message intended for the terminal device at the PO for the terminal device.

Accordingly, in the paging method of the embodiments of the application, the terminal device determines the PO for this terminal device according to the identifier of the terminal device and the AC corresponding to the terminal device, and monitors the paging message intended for the terminal device at the PO for this terminal device, so that the terminal device can be prevented from reading DCI and even paging messages not belonging to this terminal device, and an overhead brought by a paging process may further be reduced.

In an exemplary implementation of the second embodiment, the operation that the terminal device determines the PO for the terminal device according to the identifier of the terminal device and the AC corresponding to the terminal device may include that:

the terminal device acquires a corresponding relationship between at least one paging group and at least one AC, the terminal device determines at least one paging group to which the terminal device belongs according to the AC corresponding to the terminal device and the corresponding relationship between the at least one paging group and the at least one AC, wherein multiple terminal devices belonging to a same paging group have a same PO and multiple terminal devices in different paging groups have different POs, the terminal device receives first indication information sent by a network device through a PDCCH, the first indication information being configured to indicate a paging group to which the terminal device presently belongs, and the terminal device determines a PO of the paging group to which the terminal device presently belongs according to the first indication information; and the operation that the terminal device monitors the paging message intended for the terminal device at the PO for the terminal device may include that:

the terminal device monitors the paging message at the PO of the paging group to which the terminal device presently belongs.

In an implementation of the second embodiment, the operation that the terminal device acquires the corresponding relationship between the at least one paging group and the at least one AC may include that:

the terminal device receives a system broadcast system sent by the network device, the system broadcast message including second indication information and the second indication information being configured to indicate a corresponding relationship between at least one paging group and at least one AC.

In an implementation of the second embodiment, the operation that the terminal device acquires the corresponding relationship between the at least one paging group and the at least one AC may include that:

the terminal device receives third indication information sent by the network device through RRC signaling, the third indication information being configured to indicate a corresponding relationship between at least one paging group and at least one AC.

In an exemplary implementation of the second embodiment, in a case where the corresponding relationship, indicated by the third indication information, between the at least one paging group and the at least one AC is the same in multiple cells, the third indication information may further be configured to indicate cell information of the multiple cells; and the method may further include that:

in a case where the terminal device accesses the multiple cells, the terminal device determines the at least one paging group to which the terminal device belongs according to the identifier of the terminal device, the AC corresponding to the terminal device and the corresponding relationship, indicated by the third indication information, between the at least one paging group and the at least one AC.

In an exemplary implementation of the second embodiment, in a case where the terminal device corresponds to multiple ACs, the operation that the terminal device determines the PO for the terminal device according to the identifier of the terminal device and the AC corresponding to the terminal device may include that:

the terminal device determines multiple POs for the terminal device according to the identifier of the terminal device and the multiple ACs, the multiple ACs being in one-to-one correspondence with the multiple POs; and the operation that the terminal device monitors the paging message intended for the terminal device at the PO for the terminal device may include that:

the terminal device monitors the paging message intended for the terminal device at the multiple POs.

According to a third embodiment, the embodiments of the application provide a network device, which may include modules or units executing the method in the first embodiment or any optional implementation of the first embodiment.

According to a fourth embodiment, the embodiments of the application provide a terminal device, which may include modules or units executing the method in the second embodiment or any optional implementation of the second embodiment.

According to a fifth embodiment, a network device is provided, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the first embodiment or any possible implementation of the first embodiment.

According to a sixth embodiment, a terminal device is provided, which includes a processor, a memory and a communication interface. The processor is connected with the memory and the communication interface. The memory is configured to store an instruction, the processor is configured to execute the instruction, and the communication interface is configured to communicate with another network element under control of the processor. When the processor executes the instruction stored in the memory, such execution enables the processor to execute the method in the second embodiment or any possible implementation of the second embodiment.

According to a seventh embodiment, a computer storage medium is provided, in which a program code is stored, the program code being configured to indicate a computer to execute instructions of the methods in each embodiment.

According to an eighth embodiment, a computer program product including an instruction is provided, which runs on a computer to enable the computer to execute the methods in each embodiment.

DETAILED DESCRIPTION OF THE EMBODIMENTS

The technical solutions in the embodiments of the application will be clearly and completely described below in combination with the drawings in the embodiments of the application.

The technical solutions of the embodiments of the application may be applied to a 5G NR communication system.

The terminal device in the embodiments of the application may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, a terminal device in a 5G network, a terminal device in a future evolved Public Land Mobile Network (PLMN) or the like. There are no limits made in the embodiments of the application.

Each embodiment of the application is described in combination with a network device. The network device in the embodiments of the application may be a device configured to communicate with the terminal device. The network device may be an Evolutional NodeB (eNB or eNodeB) in an LTE system, and may also be a wireless controller in a Cloud Radio Access Network (CRAN) scenario. Or the network device may be a relay station, an access point, a vehicle-mounted device, a wearable device, a Next Generation Evolutional NodeB (NG-eNB), an access network device (for example, gNB) in the 5G network, an access network device in the future evolved PLMN or the like. There are no limits made in the embodiments of the application.

Figure 1:
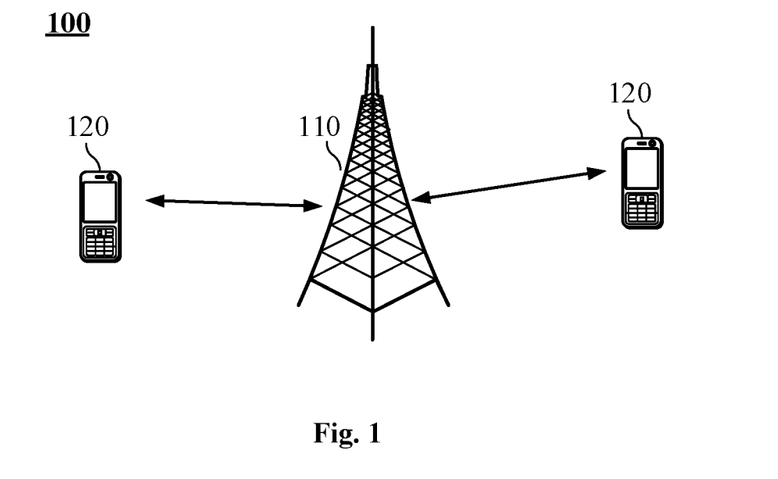
FIG. 1 is a schematic diagram of an application scenario according to an embodiment of the application.

A network device and two terminal devices are exemplarily illustrated in FIG. 1. In an exemplary embodiment, a wireless communication system 100 may include multiple network devices and a different number of terminal devices may be included in coverage of each network device. There are no limits made thereto in the embodiments of the application.

In an exemplary embodiment, the wireless communication system 100 may further include another network entity such as an Access and Mobility Management Function (AMF), a Session Management Function (SMF), a Unified Data Management (UDM) and an Authentication Server Function (ASF). There are no limits made thereto in the embodiments of the application.

In addition, each embodiment or characteristic of the application may be implemented into a method, a device or a product programmed with a standard and/or using an engineering technology. Term "product" used in the application covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). Moreover, various storage media described in the invention may represent one or more devices and/or other machine-readable media configured to store information. Term "machine-readable medium" may include, but not limited to, various media capable of storing, including and/or bearing instructions and/or data.

The terms "system" and "network" in the invention may usually be exchanged in the invention. In the invention, term "and/or" is only an association relationship describing associated objects and represents that three relationships may exist. For example, A and/or B may represent three conditions: i.e., independent existence of A, existence of both A and B and independent existence of B. In addition, character "/" in the invention usually represents that previous and next associated objects form an "or" relationship.

Figure 2:
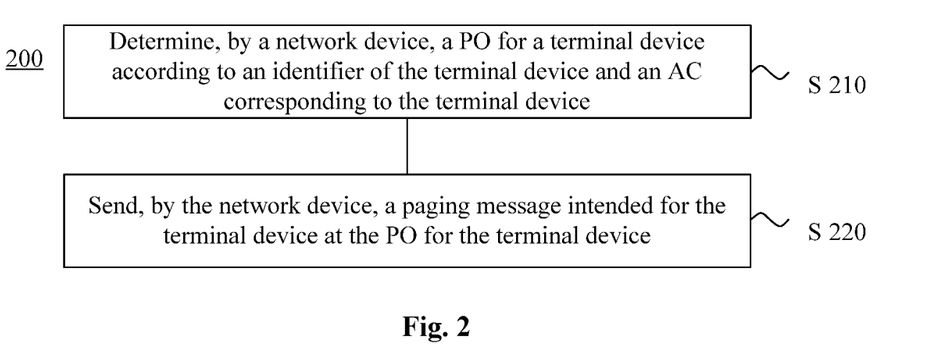
FIG. 2 is a schematic flowchart of a paging method according to an embodiment of the application.

FIG. 2 is a schematic flowchart of a paging method 200 according to an embodiment of the application. The method 200 may optionally be applied, but not limited, to a system shown in FIG. 1. The method 200 may include at least part of contents in the following contents.

In S210, a network device determines a PO for a terminal device according to an identifier of the terminal device and an AC corresponding to the terminal device.

For example, the network device may be an access network device (for example, a gNB).

In an exemplary embodiment, the identifier of the terminal device (e.g., a UE ID) may be part of a truncated IMSI. For example, the UE ID=IMSI mod 1024.

The IMSI consists of three parts, i.e., a Mobile Country Code (MCC), a Mobile Network Code (MNC) and a Mobile Subscriber Identification Number (MSIN), corresponding to three different dimensions of country, operating company and user respectively.

For example, when the IMSI is 460030912121001, the MCC=460, the MNC=03 and the MSIN=0912121001.

In an exemplary embodiment, for a specific terminal device, its corresponding AC configured for cell access or Access Identifier Number (AIN) configured to identify the AC is determined.

In an exemplary embodiment, one terminal device may correspond to multiple ACs. That is, one terminal device may access a cell based on multiple ACs.

For example, Table 1 is a table about a corresponding relationship between an AIN and a configuration parameter of a terminal device. In Table 1, a terminal device configured for Multimedia Priority Service (MPS) corresponds to an AIN 1; a terminal device configured for Mission Critical Service (MCS) corresponds to an AIN 2; an AIN 3 to an AIN 10 are reserved; and for a terminal device of which a home PLMN does not exist in an Equivalent Home Public Land Mobile Network (EHPLMN) list or the PLMN exists in any EHPLMN list, an AIN 11 to an AIN 15 are effective.

TABLE 1

| AIN | Configuration parameter of a terminal device |
|---|---|
| 0 | No parameter is configured for the terminal device in the table |

TABLE 1-continued

| AIN | Configuration parameter of a terminal device |
|---|---|
| 1 | Terminal device configured for MPS |
| 2 | Terminal device configured for MCS |
| 3-10 | Reserved |
| 11 | Access Class 11 is configured in the terminal device |
| 12 | Access Class 12 is configured in the terminal device |
| 13 | Access Class 13 is configured in the terminal device |
| 14 | Access Class 14 is configured in the terminal device |
| 15 | Access Class 15 is configured in the terminal device |

In an exemplary embodiment, PO represents a subframe moment when the paging message may be sent, PF represents a System Frame Number (SFN) where the paging message appears, and a PF includes one or more POs.

For example, the PO obtained by UE_ID-based modulo calculation may further be distinguished in combination with AC information. This means that terminal devices with the same UE_ID-based modulo calculation result may be configured with different POs in case of different ACs.

In an exemplary embodiment, the network device, when determining the PO, refers to the UE_ID and the AC and may also refer to a communication system type, Ns and i_s. Herein, the communication system type may be Time Division Duplex (TDD) and may also be Frequency Division Duplex (FDD); Ns represents the number of paging subframes in each PF; and i_s represents an index of a paging subframe.

For example, Ns=max(1, nB/T), where nB represents a paging density and T represents a Discontinuous Reception (DRX) cycle or paging cycle of the UE.

For example, i_s=floor (UE_ID/N) mod Ns, where N=min(T, nB), that is, N is a minimum value between T and nB.

In an exemplary embodiment, when the network device determines that an SFN meets the following formula 1, the SFN may be determined as a PF:

$$\text{SFN mod } T=(T \text{ div } N)*(\text{UE\_ID mod } N) \quad \text{Formula 1,}$$

where T represents the DRX cycle or paging cycle of the UE, N=min(T, nB) and nB represents the paging density.

In an exemplary embodiment, the network device, when determining the PF, may also refer to the AC information.

In S220, the network device sends a paging message intended for the terminal device at the PO for the terminal device.

For a terminal device in an idle state, the network device sends a paging message to determine a position of the terminal device and initiates connection establishment.

For example, the network device, when being required to send a message (for example, a data resource) to the terminal device in the idle state, sends the paging message to the terminal device.

In some exemplary embodiments, a paging process refers to that the network device sends the paging message to a UE at the PO to notify the UE to execute a corresponding operation or update a related parameter. No matter whether the UE is in the idle state or a connected state, the paging message from a network side may be received. The UE in an RRC connected state may decode the paging message to judge whether there exists a system information change at present or not, and the UE, once detecting the system information change, may re-read system information. The UE in an RRC idle state may learn about whether there exists the system information change at present or not and may also learn about whether there is an incoming call of the UE at present or not, and the UE, once detecting the incoming call, may subsequently trigger a random access process.

In an exemplary embodiment, in a case where the terminal device corresponds to multiple ACs, the network device determines the PO for the terminal device according to the identifier of the terminal device and a first AC, the first AC belonging to the multiple ACs; and the network device sends the paging message intended for the terminal device at the PO for the terminal device.

In an exemplary embodiment, in a case where the terminal device corresponds to the multiple ACs, the terminal device may determine multiple POs according to the identifier of the terminal device and the multiple ACs, the multiple ACs being in one-to-one correspondence with the multiple POs; and the terminal device monitors the paging message intended for the terminal device at the multiple POs.

Accordingly, in a case where the terminal device belongs to the multiple ACs, the network device may perform paging according to one AC and the terminal device may perform paging reception according to the multiple ACs, so that an overhead of the network device is reduced.

In an exemplary embodiment, the network device determines at least one paging group to which the terminal device belongs according to the identifier of the terminal device and the AC corresponding to the terminal device, wherein multiple terminal devices belonging to a same paging group have a same PO and multiple terminal devices in different paging groups have different POs.

The network device determines a PO of a paging group to which the terminal device presently belongs.

The network device sends the paging message intended for the terminal device at the PO of the paging group to which the terminal device presently belongs.

For example, the terminal device corresponds an AC 1, an AC 2 and an AC 3, the network device determines that the terminal device belongs to a paging group 1 (determined according to the AC 1), a paging group 2 (determined according to the AC 2) and a paging group 3 (determined according to the AC 3), and a cell where the terminal device presently resides only allows access in a manner of the AC 1, so that the terminal device may determine a PO of the paging group 1 to which the terminal device presently belongs and sends the paging message intended for the terminal device at the PO of the paging group 1.

In an exemplary embodiment, the network device may send first indication information to the terminal device through a PDCCH at the same time of sending the paging message intended for the terminal device at the PO of a paging group to which the terminal device presently belongs, the first indication information being configured to indicate the paging group to which the terminal device presently belongs.

For example, the terminal device corresponds the AC 1, the AC 2 and the AC 3, the network device determines that the terminal device belongs to the paging group 1 (determined according to the AC 1), the paging group 2 (determined according to the AC 2) and the paging group 3 (determined according to the AC 3), and the cell where the terminal device presently resides allows access in the manner of the AC 1 and also allows access in a manner of the AC 2. In such case, the network device may determine a PO of the paging group 2 to which the terminal device presently belongs and sends the paging message intended for the terminal device at the PO of the paging group 2. Meanwhile, the network device may send the first indication information to the terminal device through the PDCCH, the first indication information being configured to indicate the paging group 2 to which the terminal device presently belongs.

In an exemplary embodiment, before the operation that the network device sends the paging message intended for the terminal device at the PO for the terminal device, the method 200 further includes that:

the network device sends a system broadcast message to the terminal device, the system broadcast message including second indication information and the second indication information being configured to indicate a corresponding relationship between at least one paging group and at least one AC.

In an exemplary embodiment, before the operation that the network device sends the paging message intended for the terminal device at the PO for the terminal device, the method 200 further includes that:

the network device sends third indication information to the terminal device through RRC signaling, the third indication information being configured to indicate a corresponding relationship between at least one paging group and at least one AC.

The terminal device, when entering a cell, may enter the connected state at first, thereby receiving the third indication information from the network device through RRC dedicated signaling. For example, the terminal device actively triggers and enters the connected state.

In an exemplary embodiment, in a case where the corresponding relationship, indicated by the third indication information, between the at least one paging group and the at least one AC is the same in multiple cells, the third indication information is further configured to indicate cell information of the multiple cells.

Accordingly, in the paging method of the embodiments of the application, the network device determines the PO for the terminal device according to the identifier of the terminal device and the AC corresponding to the terminal device, and sends the paging message intended for the terminal device at the PO for the terminal device, so that the terminal device can be prevented from reading DCI and paging messages not belonging to this terminal device, and an overhead brought by a paging process may further be reduced.

In an exemplary embodiment, the network device determines the PO for the terminal device according to the AC corresponding to the terminal device, and the network device sends the paging message intended for the terminal device at the PO for the terminal device.

Figure 3:
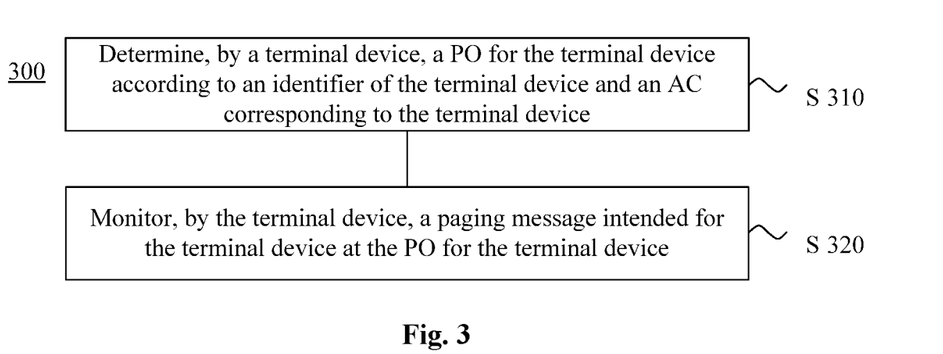
FIG. 3 is a schematic flowchart of another paging method according to an embodiment of the application.

FIG. 3 is a schematic flowchart of a paging method 300 according to an embodiment of the application. The method 300 may optionally be applied, but not limited, to a system shown in FIG. 1. The method 300 may include at least part of contents in the following contents.

In S310, a terminal device determines a PO for the terminal device according to an identifier of the terminal device and an AC corresponding to the terminal device.

In S320, the terminal device monitors a paging message intended for the terminal device at the PO for the terminal device.

The terminal device is only required to monitor a PO subframe for itself in each DRX cycle or paging cycle.

In an exemplary embodiment, the terminal device acquires a corresponding relationship between at least one paging group and at least one AC;

the terminal device determines at least one paging group to which the terminal device belongs according to the AC corresponding to the terminal device and the corresponding relationship between the at least one paging group and the at least one AC, wherein multiple terminal devices belonging to a same paging group have a same PO and multiple terminal devices in different paging groups have different POs;

the terminal device receives first indication information sent by a network device through a PDCCH, the first indication information being configured to indicate a paging group to which the terminal device presently belongs;

the terminal device determines a PO of the paging group to which the terminal device presently belongs according to the first indication information; and the terminal device monitors the paging message at the PO of the paging group to which the terminal device presently belongs.

In an exemplary embodiment, the terminal device receives a system broadcast system sent by the network device, the system broadcast message including second indication information and the second indication information being configured to indicate a corresponding relationship between at least one paging group and at least one AC.

In another exemplary embodiment, the terminal device receives third indication information sent by the network device through RRC signaling, the third indication information being configured to indicate a corresponding relationship between at least one paging group and at least one AC.

As an exemplary implementation of the exemplary embodiment, in a case where the corresponding relationship, indicated by the third indication information, between the at least one paging group and the at least one AC is the same in multiple cells, the third indication information is further configured to indicate cell information of the multiple cells; and the method 300 further includes that:

in a case where the terminal device accesses the multiple cells, the terminal device determines the at least one paging group to which the terminal device belongs according to the identifier of the terminal device, the AC corresponding to the terminal device and the corresponding relationship, indicated by the third indication information, between the at least one paging group and the at least one AC.

In some exemplary embodiments, in a case where the terminal device corresponds to multiple ACs, the terminal device determines multiple POs for the terminal device according to the identifier of the terminal device and the multiple ACs, the multiple ACs being in one-to-one correspondence with the multiple POs; and the terminal device monitors the paging message intended for the terminal device at the multiple POs.

Accordingly, in the paging method of the embodiments of the application, the terminal device determines the PO for this terminal device according to the identifier of the terminal device and the AC corresponding to the terminal device, and monitors the paging message intended for the terminal device at the PO for this terminal device, so that the terminal device can be prevented from reading DCI and even paging messages not belonging to this terminal device, and an overhead brought by a paging process may further be reduced.

In an exemplary embodiment, the terminal device determines the PO for the terminal device according to the AC corresponding to the terminal device, and the terminal device monitors the paging message for the PE at the PO for the terminal device.

The paging method 300 corresponds to corresponding operations in the method 200, and the operations in the paging method 300 may refer to descriptions about the corresponding operations in the paging method 200 and, for simplicity, will not be elaborated herein.

Figure 4:
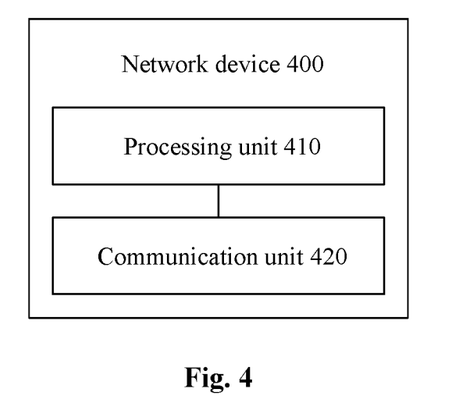
FIG. 4 is a schematic block diagram of a network device according to an embodiment of the application.

FIG. 4 is a schematic block diagram of a network device 400 according to an embodiment of the application. The network device 400 includes:

a processing unit 410, configured to determine a PO for a terminal device according to an identifier of the terminal device and an AC corresponding to the terminal device; and a communication unit 420, configured to send a paging message intended for the terminal device at the PO for the terminal device.

In an exemplary embodiment, the processing unit 410 is configured to:

determine at least one paging group to which the terminal device belongs according to the identifier of the terminal device and the AC corresponding to the terminal device, wherein multiple terminal devices belonging to a same paging group have a same PO and multiple terminal devices in different paging groups have different POs, and determine a PO of a paging group to which the terminal device presently belongs; and the communication unit 420 is configured to:

send the paging message intended for the terminal device at the PO of the paging group to which the terminal device presently belongs.

In an exemplary embodiment, the communication unit 420 is further configured to send first indication information to the terminal device through a PDCCH, the first indication information being configured to indicate the paging group to which the terminal device presently belongs.

In an exemplary embodiment, before the communication unit 420 sends the paging message intended for the terminal device at the PO for the terminal device, the communication unit 420 is further configured to send a system broadcast message to the terminal device, the system broadcast message including second indication information and the second indication information being configured to indicate a corresponding relationship between at least one paging group and at least one AC.

In an exemplary embodiment, before the communication unit 420 sends the paging message intended for the terminal device at the PO for the terminal device, the communication unit 420 is further configured to send third indication information to the terminal device through RRC signaling, the third indication information being configured to indicate a corresponding relationship between at least one paging group and at least one AC.

In an exemplary embodiment, in a case where the corresponding relationship, indicated by the third indication information, between the at least one paging group and the at least one AC is the same in multiple cells, the third indication information is further configured to indicate cell information of the multiple cells.

In an exemplary embodiment, in a case where the terminal device corresponds to multiple ACs, the processing unit 410 is configured to:

determine the PO for the terminal device according to the identifier of the terminal device and a first AC, the first AC belonging to the multiple ACs.

The network device 400 may correspond to the network device in the method 200 and may implement corresponding operations implemented by the network device in the method 200. For simplicity, no more elaborations will be made herein.

Figure 5:
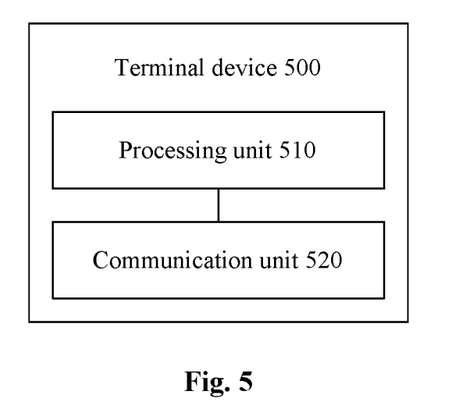
FIG. 5 is a schematic block diagram of a terminal device according to an embodiment of the application.

FIG. 5 is a schematic block diagram of a terminal device 500 according to an embodiment of the application. The terminal device 500 includes:

a processing unit 510, configured to determine a PO for the terminal device according to an identifier of the terminal device and an AC corresponding to the terminal device; and a communication unit 520, configured to monitor a paging message intended for the terminal device at the PO for the terminal device.

In an exemplary embodiment, the communication unit 520 is further configured to acquire a corresponding relationship between at least one paging group and at least one AC;

the processing unit 510 is further configured to determine at least one paging group to which the terminal device belongs according to the AC corresponding to the terminal device and the corresponding relationship between the at least one paging group and the at least one AC, wherein multiple terminal devices belonging to a same paging group have a same PO and multiple terminal devices in different paging groups have different POs;

the communication unit 520 is further configured to receive first indication information sent by a network device through a PDCCH, the first indication information being configured to indicate a paging group to which the terminal device presently belongs;

the processing unit 510 is further configured to determine a PO of the paging group to which the terminal device presently belongs according to the first indication information; and the communication unit 520 is further configured to monitor the paging message at the PO of the paging group to which the terminal device presently belongs.

In an exemplary embodiment, the communication unit 520 is configured to:

receive a system broadcast system sent by the network device, the system broadcast message including second indication information and the second indication information being configured to indicate a corresponding relationship between at least one paging group and at least one AC.

In an exemplary embodiment, the communication unit 520 is configured to:

receive third indication information sent by the network device through RRC signaling, the third indication information being configured to indicate a corresponding relationship between at least one paging group and at least one AC.

In an exemplary embodiment, in a case where the corresponding relationship, indicated by the third indication information, between the at least one paging group and the at least one AC is the same in multiple cells, the third indication information is further configured to indicate cell information of the multiple cells; and the processing unit 510 is further configured to, in a case where the terminal device accesses the multiple cells, determine the at least one paging group to which the terminal device belongs according to the identifier of the terminal device, the AC corresponding to the terminal device and the corresponding relationship, indicated by the third indication information, between the at least one paging group and the at least one AC.

In an exemplary embodiment, in a case where the terminal device corresponds to multiple ACs, the processing unit 510 is configured to:

determine multiple POs for the terminal device according to the identifier of the terminal device and the multiple ACs, the multiple ACs being in one-to-one correspondence with the multiple POs; and the communication unit 520 is configured to:

monitor the paging message intended for the terminal device at the multiple POs.

The terminal device 500 may correspond to the terminal device in the method 300 and may implement corresponding operations implemented by the terminal device in the method 300. For simplicity, no more elaborations will be made herein.

Figure 6:
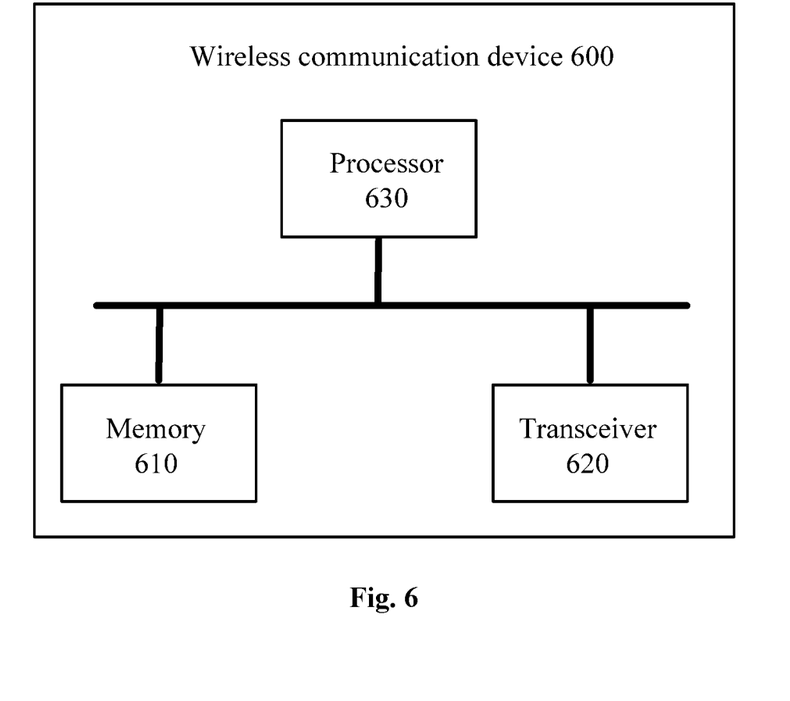
FIG. 6 is a schematic block diagram of a wireless communication device according to an embodiment of the application.

FIG. 6 is a schematic block diagram of a wireless communication device 600 according to an embodiment of the application. The device 600 includes:

a memory 610, configured to store a program, the program including a code;

a transceiver 620, configured to communicate with another device; and a processor 630, configured to execute the program code in the memory 610.

In an exemplary embodiment, the transceiver 620 is configured to execute specific signal transmission and reception under driving of the processor 630.

In an exemplary embodiment, when the code is executed, the processor 630 may implement each operation executed by the network device in the method 200 in FIG. 2. For simplicity, no more elaborations will be made herein. In such case, the device 600 may be a network device, for example, a base station.

In an exemplary embodiment, when the code is executed, the processor 630 may further implement each operation executed by the terminal device in the method 300 in FIG. 3. For simplicity, no more elaborations will be made herein. In such case, the device 600 may be a terminal device, for example, a mobile phone.

In the embodiment of the application, the processor 630 may be a Central Processing Unit (CPU), and the processor 630 may also be another universal processor, a Digital Signal Processor (DSP), an Application Specific Integrated Circuit (ASIC), a Field-Programmable Gate Array (FPGA) or another programmable logic device, a discrete gate or a transistor logic device, a discrete hardware component and the like. The universal processor may be a microprocessor, or the processor may also be any conventional processor and the like.

The memory 610 may include a read-only memory and a random access memory, and provides an instruction and data for the processor 630. Apart of the memory 610 may further include a nonvolatile random access memory. For example, the memory 610 may further store information of a device type.

The transceiver 620 may be configured to realize signal sending and receiving functions, for example, frequency modulation and demodulation functions or up-conversion and down-conversion functions.

In an implementation process, at least one operation of the method may be completed through an integrated logical circuit of hardware in the processor 630, or the integrated logical circuit may complete the at least one operation under driving of an instruction in a software form. Therefore, the wireless communication device 600 may be a chip or a chip set. The operations of the method disclosed in combination with the embodiments of the application may be directly embodied to be executed and completed by a hardware processor or executed and completed by a combination of hardware and software modules in the processor. The software module may be located in a mature storage medium in this field such as a random access memory, a flash memory, a read-only memory, a programmable read-only memory or electrically erasable programmable read-only memory and a register. The storage medium is located in the memory, and the processor 630 reads information in the memory, and completes the operations of the methods in combination with hardware. No more detailed descriptions will be made herein to avoid repetitions.

Figure 7:
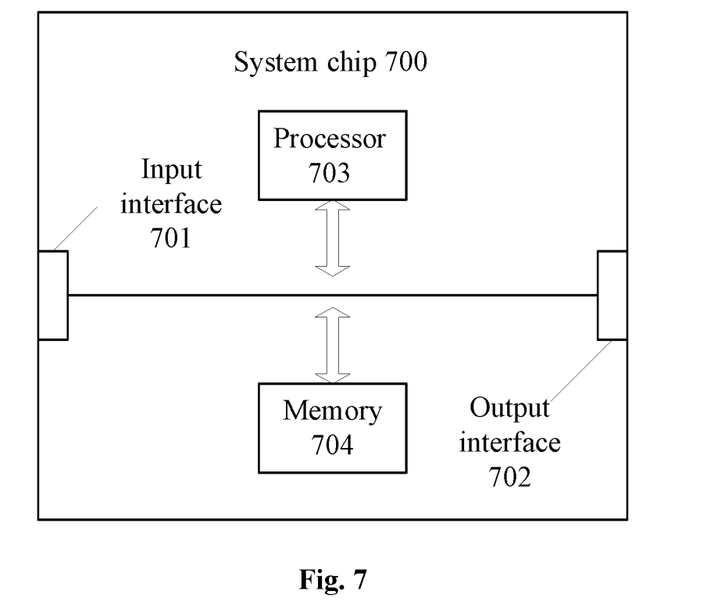
FIG. 7 is a schematic structure diagram of a system chip according to an embodiment of the application.

FIG. 7 is a schematic structure diagram of a system chip 700 according to an embodiment of the application. The system chip 700 of FIG. 7 includes an input interface 701, output interface 702, processor 703 and memory 704 which may be connected through an internal communication connecting line. The processor 703 is configured to execute a code in the memory 704.

In an exemplary embodiment, when the code is executed, the processor 703 implements the methods executed by the network device in the method embodiments. For simplicity, no more elaborations will be made herein.

In an exemplary embodiment, when the code is executed, the processor 703 implements the methods executed by the terminal device in the method embodiments. For simplicity, no more elaborations will be made herein.

The embodiments may be implemented completely or partially through software, hardware, firmware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the application are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

In various embodiments of the application, a magnitude of a sequence number of each process does not mean an execution sequence and the execution sequence of each process should be determined by the function of various processes and an internal logic and should not form any limit to an implementation process of the embodiments of the application.

Those skilled in the art may clearly learn about that, for convenient and brief description, specific working processes of the system, device and unit described above may refer to the corresponding processes in the method embodiments and will not be elaborated herein.

The above is only the exemplary implementation of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

What is claimed is:

1. A paging method, comprising:

determining, by a terminal device, a Paging Occasion (PO) for the terminal device according to an identifier of the terminal device and an Access Class (AC) corresponding to the terminal device; and monitoring, by the terminal device, a paging message intended for the terminal device at the PO for the terminal device;

wherein determining, by the terminal device, the PO for the terminal device according to the identifier of the terminal device and the AC corresponding to the terminal device comprises:

receiving, by the terminal device, a system broadcast message sent by the network device, the system broadcast message comprising second indication information and the second indication information being configured to indicate a corresponding relationship between at least one paging group and at least one AC;

determining, by the terminal device, at least one paging group to which the terminal device belongs according to the AC corresponding to the terminal device and the corresponding relationship between the at least one paging group and the at least one AC; and determining, by the terminal device, a PO of a paging group to which the terminal device presently belongs.

2. The method as claimed in claim 1, wherein multiple terminal devices belonging to a same paging group have a same PO and multiple terminal devices in different paging groups have different POs, monitoring, by the terminal device, the paging message intended for the terminal device at the PO for the terminal device comprises:

monitoring, by the terminal device, the paging message at the PO of the paging group to which the terminal device presently belongs.

3. The method as claimed in claim 2, wherein the method further comprising:

receiving, by the terminal device, third indication information sent by the network device through Radio Resource Control (RRC) signaling, the third indication information being configured to indicate a corresponding relationship between at least one paging group and at least one AC.

4. The method as claimed in claim 3, wherein, in a case where the corresponding relationship, indicated by the third indication information, between the at least one paging group and the at least one AC is the same in multiple cells, the third indication information is further configured to indicate cell information of the multiple cells; and the method further comprises:

in a case where the terminal device accesses the multiple cells, determining, by the terminal device, the at least one paging group to which the terminal device belongs according to the identifier of the terminal device, the AC corresponding to the terminal device and the corresponding relationship, indicated by the third indication information, between the at least one paging group and the at least one AC.

5. The method as claimed in claim 2, wherein determining, by the terminal device, the PO of the paging group to which the terminal device presently belongs comprises:

receiving, by the terminal device, first indication information sent by a network device through a Physical Downlink Control Channel (PDCCH), the first indication information being configured to indicate the paging group to which the terminal device presently belongs, and determining, by the terminal device, the PO of the paging group to which the terminal device presently belongs according to the first indication information.

6. The method as claimed in claim 1, wherein, in a case where the terminal device corresponds to multiple ACs, determining, by the terminal device, the PO for the terminal device according to the identifier of the terminal device and the AC corresponding to the terminal device comprises:

determining, by the terminal device, multiple POs for the terminal device according to the identifier of the terminal device and the multiple ACs, the multiple ACs being in one-to-one correspondence with the multiple POs; and monitoring, by the terminal device, the paging message intended for the terminal device at the PO for the terminal device comprises:

monitoring, by the terminal device, the paging message intended for the terminal device at the multiple POs.

7. A network device, comprising a processor and a memory, wherein the memory stores a code, and the processor is configured to execute the program code in the memory to implement the following units:

a processing unit, configured to determine a Paging Occasion (PO) for a terminal device according to an identifier of the terminal device and an Access Class (AC) corresponding to the terminal device; and a communication unit, configured to send a paging message intended for the terminal device at the PO for the terminal device;

wherein the communication unit is further configured to send a system broadcast message to the terminal device, the system broadcast message comprising second indication information and the second indication information being configured to indicate a corresponding relationship between at least one paging group and at least one AC;

the processing unit is configured to determine at least one paging group to which the terminal device belongs according to the AC corresponding to the terminal device and the corresponding relationship between the at least one paging group and the at least one AC; and to determine a PO of a paging group to which the terminal device presently belongs.

8. The network device as claimed in claim 7, wherein multiple terminal devices belonging to a same paging group have a same PO and multiple terminal devices in different paging groups have different POs, and the communication unit is configured to:

send the paging message intended for the terminal device at the PO of the paging group to which the terminal device presently belongs.

9. The network device as claimed in claim 8, wherein the communication unit is further configured to send first indication information to the terminal device through a Physical Downlink Control Channel (PDCCH), the first indication information being configured to indicate the paging group to which the terminal device presently belongs.

10. The network device as claimed in claim 8, wherein, before the communication unit sends the paging message intended for the terminal device at the PO for the terminal device, the communication unit is further configured to send third indication information to the terminal device through Radio Resource Control (RRC) signaling, the third indication information being configured to indicate a corresponding relationship between at least one paging group and at least one AC.

11. The network device as claimed in claim 10, wherein, in a case where the corresponding relationship, indicated by the third indication information, between the at least one paging group and the at least one AC is the same in multiple cells, the third indication information is further configured to indicate cell information of the multiple cells.

12. The network device as claimed in claim 7, wherein, in a case where the terminal device corresponds to multiple ACs,
the processing unit is configured to:
determine the PO for the terminal device according to the identifier of the terminal device and a first AC, the first AC belonging to the multiple ACs.

13. A terminal device, comprising a processor and a memory, wherein the memory stores a code, and the processor is configured to execute the program code in the memory to implement the following units:
a processing unit, configured to determine a Paging Occasion (PO) for the terminal device according to an identifier of the terminal device and an Access Class (AC) corresponding to the terminal device; and
a communication unit, configured to monitor a paging message intended for the terminal device at the PO for the terminal device;
wherein the communication unit is configured to receive a system broadcast message sent by the network device, the system broadcast message comprising second indication information and the second indication information being configured to indicate a corresponding relationship between at least one paging group and at least one AC;
the processing unit is further configured to determine at least one paging group to which the terminal device belongs according to the AC corresponding to the terminal device and the corresponding relationship between the at least one paging group and the at least one AC;
and the processing unit is further configured to determine a PO of the paging group to which the terminal device presently belongs.

14. The terminal device as claimed in claim 13, wherein multiple terminal devices belonging to a same paging group have a same PO and multiple terminal devices in different paging groups have different POs;
the communication unit is further configured to receive first indication information sent by a network device through a Physical Downlink Control Channel (PDCCH), the first indication information being configured to indicate a paging group to which the terminal device presently belongs; and
the communication unit is further configured to monitor the paging message at the PO of the paging group to which the terminal device presently belongs.

15. The terminal device as claimed in claim 14, wherein the communication unit is specifically configured to:
receive third indication information sent by the network device through Radio Resource Control (RRC) signaling, the third indication information being configured to indicate a corresponding relationship between at least one paging group and at least one AC.

16. The terminal device as claimed in claim 15, wherein, in a case where the corresponding relationship, indicated by the third indication information, between the at least one paging group and the at least one AC is the same in multiple cells, the third indication information is further configured to indicate cell information of the multiple cells; and
the processing unit is further configured to, in a case where the terminal device accesses the multiple cells, determine the at least one paging group to which the terminal device belongs according to the identifier of the terminal device, the AC corresponding to the terminal device and the corresponding relationship, indicated by the third indication information, between the at least one paging group and the at least one AC.

17. The terminal device as claimed in claim 13, wherein, in a case where the terminal device corresponds to multiple ACs,
the processing unit is configured to:
determine multiple POs for the terminal device according to the identifier of the terminal device and the multiple ACs, the multiple ACs being in one-to-one correspondence with the multiple POs; and
the communication unit is configured to:
monitor the paging message intended for the terminal device at the multiple POs.

* * * * *